United States Patent

Lipp

[15] 3,713,123

[45] Jan. 23, 1973

[54] HIGH DENSITY DATA RECORDING AND ERROR TOLERANT DATA REPRODUCING SYSTEM

[72] Inventor: James P. Lipp, Oklahoma City, Okla.

[73] Assignee: General Electric Company

[22] Filed: Dec. 18, 1969

[21] Appl. No.: 886,316

[52] U.S. Cl. ........................340/174.1 G, 340/347 R

[51] Int. Cl. ..........G08c 9/04, G11b 5/82, H041 3/00

[58] Field of Search ....340/174.1 G, 174.1 H, 347 R, 340/174.1 GH, 347 R; 235/155; 325/88 A; 178/66, 67, 68

[56] References Cited

UNITED STATES PATENTS

| | | | |
|---|---|---|---|
| 3,508,228 | 4/1970 | Bishop | 340/174.1 G |
| 3,274,611 | 9/1966 | Brown et al. | 325/38 A |
| 3,126,537 | 3/1964 | Trampel | 325/38 A |
| 3,217,316 | 11/1965 | Trampel | 325/38 A |
| 3,214,749 | 10/1965 | Karnaugh | 325/38 A |

*Primary Examiner*—Terrell W. Fears
*Assistant Examiner*—Steven B. Pokotilow
*Attorney*—Edward W. Hughes and Fred Jacob

[57] ABSTRACT

A high density recording and reproducing system in which information is divided into groups of binary digits (bits) with different flux transition patterns recorded in associated storage cells to represent each group of bits and wherein each pattern is recorded by providing a plurality of transition positions in each cell and is read by sensing signal polarity at selected positions according to decisions based on ternary pulse characteristics represented in the form of ternary digits (trits) thereby tolerating drop out and pick up errors at unsensed positions.

6 Claims, 10 Drawing Figures

INVENTOR
JAMES P. LIPP
BY [signature]
ATTORNEY

HIGH DENSITY DATA RECORDING AND ERROR TOLERANT DATA REPRODUCING SYSTEM

BACKGROUND OF THE INVENTION

The present invention relates generally to the storage and retrieval of information in binary form and is particularly applicable, although not limited, to the storage and retrieval of binary digits (bits) on and from magnetic storage media such as those used in electronic data processing systems.

FIELD OF THE INVENTION

The invention is particularly utilized in high speed data processing systems wherein information processed is supplied from any one of many types of external sources such as magnetic and thermoplastic recording tapes, magnetic discs, drums, magnetic arrays such as thin film, cores, etc., punched cards, documents bearing magnetic ink imprints, optically recognizable coded imprints, machine or hand recorded marks or other sources of electrical data.

In any storage and retrieval system, the primary objective is to accurately record and retrieve the desired information. In modern day electronic data processing systems, however, it is becoming increasingly important to increase the reliability of reproducing data which may be brought from or sent to an external storage device from the processor of a system which actually performs the computations and manipulations of the data. Additionally, because of the ever increasing volume of data which is required, it is becoming increasingly important to increase the amount of data which can be stored in a given lineal distance of a storage medium. This latter feature is commonly referred to as information "packing density" and is normally expressed in bits-per-inch, that is, the number of bits which can be stored with respect to an inch of storage medium.

It is known in the art that digital information can be stored on a medium having a magnetizable surface and that information thus stored may be recovered by providing relative movement between the medium and a transducer which detects polarity changes of discrete areas of the medium's surface. The detected pattern of magnetic polarization, or flux reversals as they are commonly called, taken in conjunction with an additional parameter, for example time or position, is indicative of the information stored and retrieved and this pattern is commonly referred to as a code.

Since given storage media, taken in conjunction with the equipment used to record thereon and read therefrom, have given bit packing densities arising from fidelity and resolution capabilities, the remaining factor on the amount of data that can be recorded in a given length of storage medium is the code or flux pattern utilized for recording data. Stated in another way, the code which provides the minimum amount of worst case flux reversal density for a given amount of information and resolution is that which will produce the highest practical amount of information storage.

For high density recording, it is desirable that the information be self-clocking. In one such system, clock transitions are recorded along with the information pulses in each storage cell and one clock pulse is recorded for each digit or bit of information represented by all of the flux reversals in the cell. Thus, any additional transitions beyond those necessary to uniquely identify the various message states may be regarded as information redundant. Further, the very nature of magnetic saturation recording imposes the requirement that each successive flux transition be alternating in direction. Together, these result in recorded patterns or sequences containing much inherent structure. In some codes, certain characteristics of the sequences may be isolated and regarded as independent identifiers while the remainder would be dependent. In such cases, it is frequently possible to exploit the useful redundancy by adopting decoding procedures that will tolerate, by means of detection or correction, certain errors that would otherwise corrupt a conventional decoding system.

Since given storage media, taken in conjunction with the equipment used to record thereon and read therefrom, have given limitations as to speed of operation and are susceptible to spurious signals as well as defects in the media and result in errors in the information being read it is desirable to provide automatic error correction. Such effects and operating restrictions provide what is often referred to as a pick up and drop out type error where a pick up error may be identified with the spurious detection of a transition or reversal at a position where none is intended and a drop out referring to the loss of a valid flux reversal or transition at a position.

The present invention utilizes a code which permits a high density of information per unit of storage capacity and which is particularly characterized by the presence of independent as well as redundant transition positions. Because the transitions at the redundant positions may be ignored in recovering the information, drop out and pick up errors at the redundant transition positions may be tolerated.

DESCRIPTION OF THE PRIOR ART

One prior art system for storing information on magnetic tape, drums, and discs employs a recording method whereby one binary state is recorded by the absence of flux transitions or non-flux reversals and the other binary state as flux reversals at a plurality of transition positions within each storage cell. Recovery of the information is achieved by detecting the presence or absence of flux reversals at each transition position and decoding the pattern of transitions in each cell to determine the group of binary bits represented. Accordingly, the prior art depends upon the correct (binary) detection of flux transition presence at each position to arrive at a correct binary configuration. A possibility for errors at each transition position therefore exists due to the possibility of errors being inserted by sensors, detection and decoding logic for conversion of sensed signals into a binary bit configuration as well as due to defects in the record media providing additional possibilities of an error being detected in each of the transition positions.

With the invention disclosed and claimed, the possibilities of experiencing an error are reduced while accurate recovery of the data is retained by automatically correcting for certain errors.

SUMMARY OF THE INVENTION

In accordance with the invention claimed, a high density recording and reproducing system is provided which eliminates the need for utilizing the transition occurring at each position of a cell. This system provides a substantial reduction in the possibility of experiencing an error, provides automatic error correction, and reduces from four to two positions where pulse decisions are relied upon for recovery of data. The recording and reproducing system utilizes a transition recording pattern and apparatus wherein a representation of three bits plus a ninth "special" pattern is recorded within a unit of the storage medium herein referred to as a cell. This is accomplished in the present invention by dividing each cell into four equal parts and recording a flux transition or reversal at two or more of the division points or positions within the cell in accordance with one of the nine appropriate pattern configurations. The actual information represented by flux transitions may be indicated by the relative position of the flux transitions within the individual cell.

Efficient utilization of the characteristics of flux polarity directions to sense the recorded information according to a ternary form is accomplished by determining the polarity direction at two of the four transition positions in each cell. Information in the ternary form has three different states which may be designated "−1", "0", or "+1" and referred to hereinafter as a ternary digit or "trit". Thus, each of the transition positions may be sensed and the direction of transition or flux reversal designated by a trit representing the direction of magnetization reversal or non-reversal. For example, the no change, positive and negative directions may be designated as the "0", "+1" and "−1"values, respectively.

By establishing that the first and third transition positions are dependent upon the second and fourth transition positions when writing data in each cell and that the second and fourth transition positions may be considered independent when reading data back from each cell, it is possible to represent each of nine data patterns by a trit in the second and fourth position only. Two flux positions will be utilized when reading data from the medium with a possibility of three different magnetization reversal states to define nine different three bit binary codes, plus "special" patterns. Therefore, the three bit binary configurations which formerly required four transition positions for reading in a binary fashion may be represented by magnetization flux reversal direction or absence thereof in the second and fourth transition positions only. A ninth pattern is available, over and above those necessary for representing three data bits, which may be used for a special purpose hereinafter described.

By establishing the three following rules regarding code properties, the trits provided by positions 2 and 4 may be utilized to reconstruct the representations for each of the four transition positions corresponding to the nine chosen configurations. The following rules apply at a data recovery circuit:

1. No four trit patterns will start or end with two consecutive non-reversals or zeros.
2. By convention, the first reversal in any pattern will be considered a digit corresponding to a negative magnetization or a -1 direction. This convention is for purposes of description. The first reversal may be recorded as either a positive magnetization or a negative magnetization. Upon readout, the first reversal in each pattern is processed in a manner described later to correspond to a negative magnetization.
3. Successive reversals must alternate in polarity. The binary bit configuration of 0 0 0 may be represented, by way of example, at positions 1, 2, 3 and 4 by a 0, −1, +1 and 0 which corresponds to a non-reversal, a negative reversal, a positive reversal and a non-reversal, respectively. Such pattern can be uniquely represented by the two trits, −1 and 0 from the second and fourth positions only. The digit in the first transition position must be a non-reversal or 0 because if the trit were a positive reversal or +1, rule 2 above would be violated. If the first transition position were a negative reversal or −1, rule 3 would be violated. Similarly, the third transition position must have a positive polarity since rule 1 prohibits having a non-reversal and rule 3 prohibits a negative reversal. Hence, all information is contained in the trits at the second and fourth positions.

The present invention, by eliminating the need for utilizing a transition decision for each cell position, reduces substantially the chance for error in the three bit plus "special" pattern readout. For example, if a drop-out or loss of a signal had occurred in either the first or third positions or both or if a pick up of an unwanted signal had occurred in the first or third positions or both, the trits corresponding to the second and fourth positions of the cell may be decoded properly to correctly identify a three bit configuration. A drop-out or loss of a signal may occur due to a low amplitude input pulse, arising from a variety of causes, which escapes detection, or from a pulse which has been shifted outside of a detection space or window due to pulse crowding effects. A pick up unwanted signal may occur due to induction of a spurious impulse into the read circuitry. Thus, automatic error correction for certain errors is provided. Transition decision as claimed is required for only two positions instead of the four positions required in prior art system requiring binary sensing of flux reversals in four transition positions of a cell. By utilizing the disclosed code requiring a polarity or the absence and presence of a flux transition in only two positions of a four position cell for correctly identifying the contained information significantly reduces the chance for an error and is an improvement over prior art code requiring a flux determination in each position of a four position cell.

It is, therefore, an object of this invention to provide an improved information recording and reproducing system.

Another object of this invention is to provide an improved reproducing system for tolerating errors.

A further object of this invention is to provide a reproducing system which automatically corrects for drop out and pick up error signals received from redundant positions in a pattern of transitions being recorded in a cell.

Still another object of this invention is to provide a reproducing system which automatically corrects errors without further delay.

Further objects and advantages of the present invention will become apparent to those skilled in the art as the description thereof proceeds.

BRIEF DESCRIPTION OF THE DRAWING

The present invention may be more readily described by reference to the accompanying drawing in which.

DETAILED DESCRIPTION OF OPERATION

Figure 1:
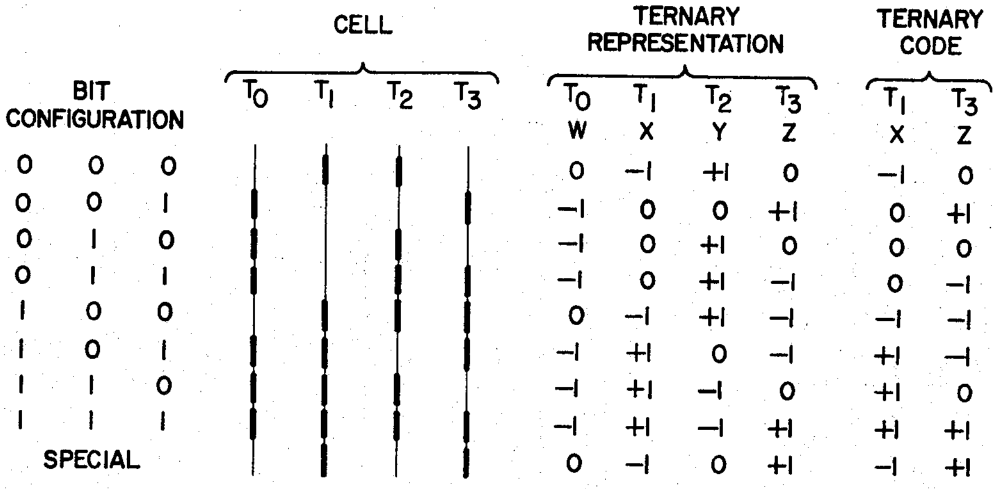
FIG. 1 is a diagram illustrating the manner in which various bit configurations are recorded within a cell area of a storage medium in accordance with the present invention together with ternary representations of corresponding transition decisions within a cell area as encountered by data recovery logic.

The manner in which information is stored as a pattern or is coded onto a recording medium may best be seen with reference to FIG. 1. In that figure, there is shown the representation of a single data cell which corresponds to a specified area of storage medium onto which the pattern representing three binary data bits is to be stored. In addition, a ninth pattern identified as "-special" for use in a manner to be described hereinafter is also provided. Each cell is divided by uniformly spaced lines $T_0$, $T_1$, $T_2$, $T_3$, collectively referred to as T times. These T times designate the subdivisions of the data cell and at these times flux reversals are placed on the storage medium to represent the various pattern configurations.

The nine patterns so chosen have the property that no pattern or combination of consecutive patterns will produce more than two consecutive non-flux transitions in a row. This is in contrast to the prior art which generates a clock transition at $T_0$ and uses $T_1$, $T_2$ and $T_3$ times to directly represent three data bits. The prior art using the option of representing a data "1" by a flux transition and a data "0" with an absent transition, would generate a pattern representing the 0 0 0 bit configuration with three consecutive non-flux transitions. Hence, this invention limits undesirable waveform distortions due to pulse crowding effects by reducing worst case non-transitions to two rather than three intervals.

An inherent property of reading magnetic recordings by means of a sensor or transducer which measures the change in magnetic flux direction or polarity is that the polarity of each successive voltage pulse must alternate. Therefore, if a given pulse is of a negative polarity, then the next pulse whether it occurs immediately or after some space in distance or time, will be of a positive polarity. Thus, a magnetic flux reversal may be detected as generating a pulse having either a positive or negative polarity. Further, in the positions where no transition appears, this condition is hereinafter referred to as being the absence of a pulse. Therefore, each transition position in a cell may be represented by a ternary digit wherein a ternary "0" represents no pulse, a ternary "+1" represents a positive polarity pulse and the ternary "−1" represents a negative pulse. As illustrated in FIG. 1, a ternary notation in the form of a pattern of ternary digits or trits may be used to represent the absence or presence of a given polarity transition at positions $T_0$, $T_1$, $T_2$ and $T_3$, or W, X, Y and Z. By observing the three rules previously given, the first non-reversal position will always be processed during readout to produce a negative polarity. The cell positions and corresponding polarity may be represented by the ternary digits or trits as illustrated in each column corresponding to positions within a cell. Upon examination of the second and fourth columns, it is seen that the three states 0, +1 and −1 each occur three times. Therefore, in combination, the second and fourth columns corresponding to cell position times $T_1$ and $T_3$ will uniquely specify the nine patterns.

The full four trit representation of W, X, Y and Z trits corresponding to cell positions $T_0$, $T_1$, $T_2$ and $T_3$ are overly redundant in that the two trit representation corresponding to X and Z or $T_1$ and $T_3$ positions are sufficient for non-redundant representation of each of the nine patterns illustrated.

In practice it has been shown that the resolution of polarity for a transition can be achieved with negligible uncertainty. The greatest probability for error in reading would likely be that a pulse with a given polarity as compared to no pulse would be erroneously interchanged as a result of noise or measurement errors. The likelihood of a negative pulse being detected as a positive pulse, or the converse, would be very small. By detecting the trits at only two positions, any pick up or drop out of positive or negative polarity signals existing only at times $T_0$ or $T_2$ would not result in an error.

The code illustrated in FIG. 1 self-synchronizes or self-clocks data read from the storage medium. By self-clocking is meant that flux reversals used to designate data occur at such intervals of time that they are also used to maintain synchronization within the system. Although clocking signals may be received from all four T positions of FIG. 1, in the described embodiment provision is made for clocking based only on $T_0$ and $T_2$ flux reversals.

In the aforementioned mode, it is seen that in the absence of a flux reversal at the $T_0$ time for each bit configuration, there will be present a flux reversal at the $T_2$ time, thus providing at least one guaranteed flux transition in each cell when clock sampling only at $T_0$ and $T_2$ times regardless of the pattern configuration being written.

Figure 2:
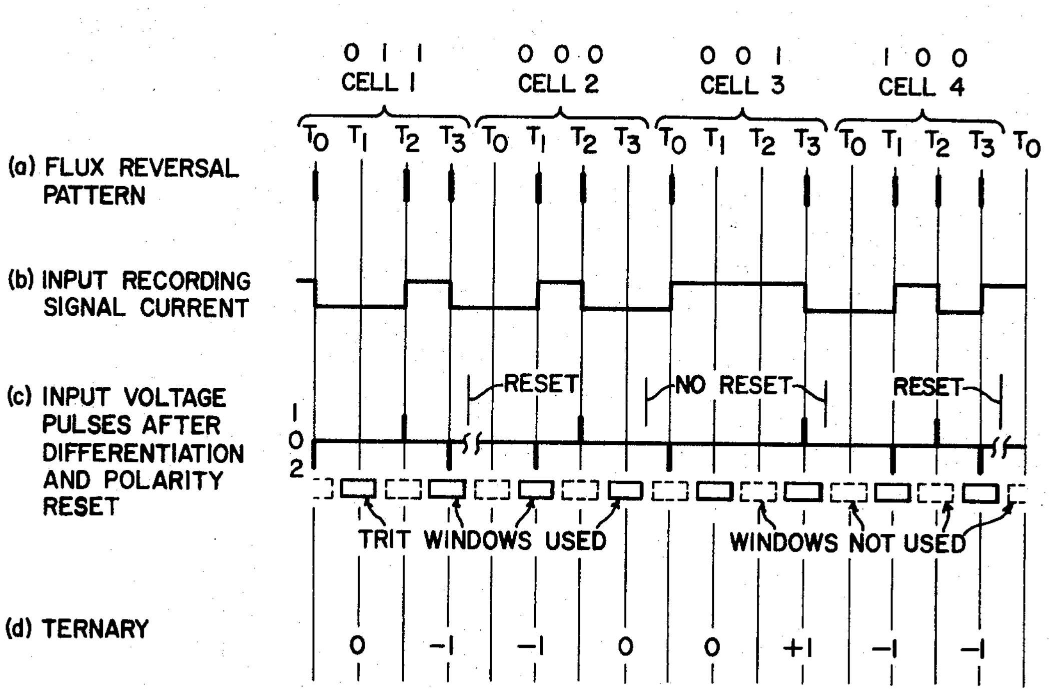
FIGS. 2(*a*), 2(*b*), 2(*c*) and 2(*d*) are diagrams illustrating arbitrary data patterns and their corresponding representations of flux reversals, current, ternary representation and voltage respectively, at various points in the data recovery system.

FIG. 2(*a*) shows the flux reversal pattern which would be written onto a magnetic recording surface for the twelve bit configuration shown which is read left to right a 0 1 1 0 0 0, 0 0 1 and 1 0 0. These twelve bits are stored in four cells with the 0 1 1 bit configuration recorded as flux reversals at $T_0$, $T_2$ and $T_3$ positions of the first cell. The 0 0 0 bit configuration is written as flux reversals at $T_1$ and $T_2$ positions of cell two, the 0 0 1 bit configuration is written as flux reversals at $T_0$ and $T_3$ positions of cell three and the 1 0 0 bit configuration is written as flux reversals at $T_1$, $T_2$ and $T_3$ positions of cell four.

With reference to FIG. 2(*b*), the flux pattern of FIG. 2(*s*) is illustrated showing one of the two possible idealized current waveforms or waveshapes which is applied to the recording head winding of a transducer in order to store on a suitable medium magnetization patterns according to the invention which are representative of a train of flux reversals selected from the bit configurations of FIG. 1. The second possible wave train for the same data would merely be a polarity reversal of FIG. 2(*b*).

FIG. 2(*c*) illustrates resultant voltage signal pulses corresponding to the flux reversal pattern illustrated in FIG. 2(*a*) and 2(*b*) which are obtained after signal processing and necessary polarity resetting has taken place. It is seen that polarities compared to FIG. 2(*b*) have been modified in some cases by polarity resetting to insure that the initial pulse of each cell will be negative. For example, between the $T_3$ time of cell 1 and the $T_0$ time of cell 2, a polarity reversal or "reset" is required to maintain the convention previously set forth in rule 2, whereby the first reversal of a cell must correspond to a negative polarity or ternary digit $-1$ signal. The switch or polarity reset, as it will be referred to hereinafter, for reversal of polarity of the incoming input voltage signal will occur when the last pulse in the previous cell is of a negative polarity. The reversal must be executed in order to satisfy the convention set forth for identifying each of the nine patterns corresponding to two trits appearing in the $T_1$ and $T_3$ positions of the cell.

FIG. 2(*d*) illustrates the ternary representations of pulses which may be sampled only at times $T_1$ and $T_3$ which will uniquely identify information contained in the four cells illustrated. It will be noted that any potential errors at time locations $T_0$ and $T_2$, such as may occur when a shifted pulse falls outside its window, will not affect the output.

Figure 3:
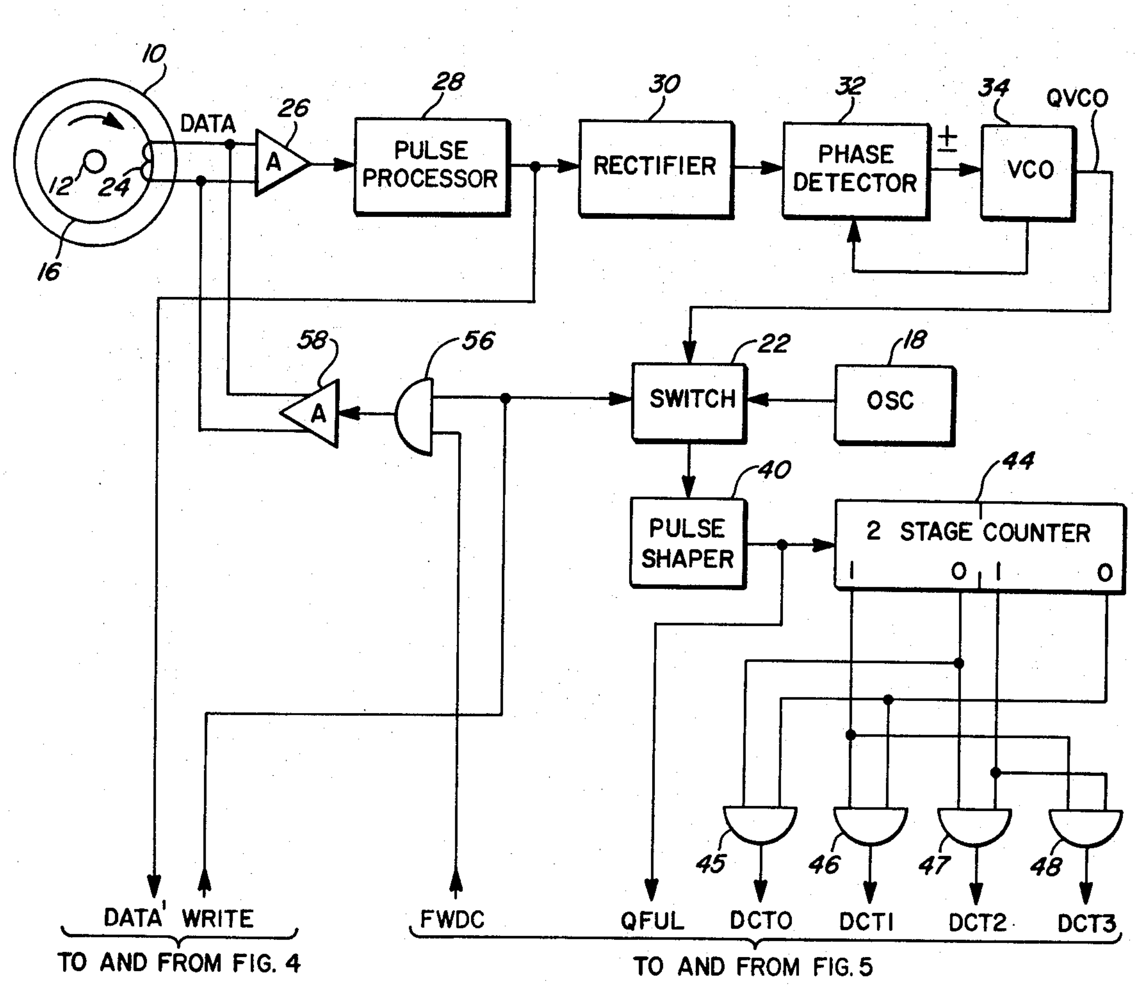
FIGS. 3, 4 and 5 are schematic diagrams illustrating a preferred means for implementing the present invention.
Figure 4:
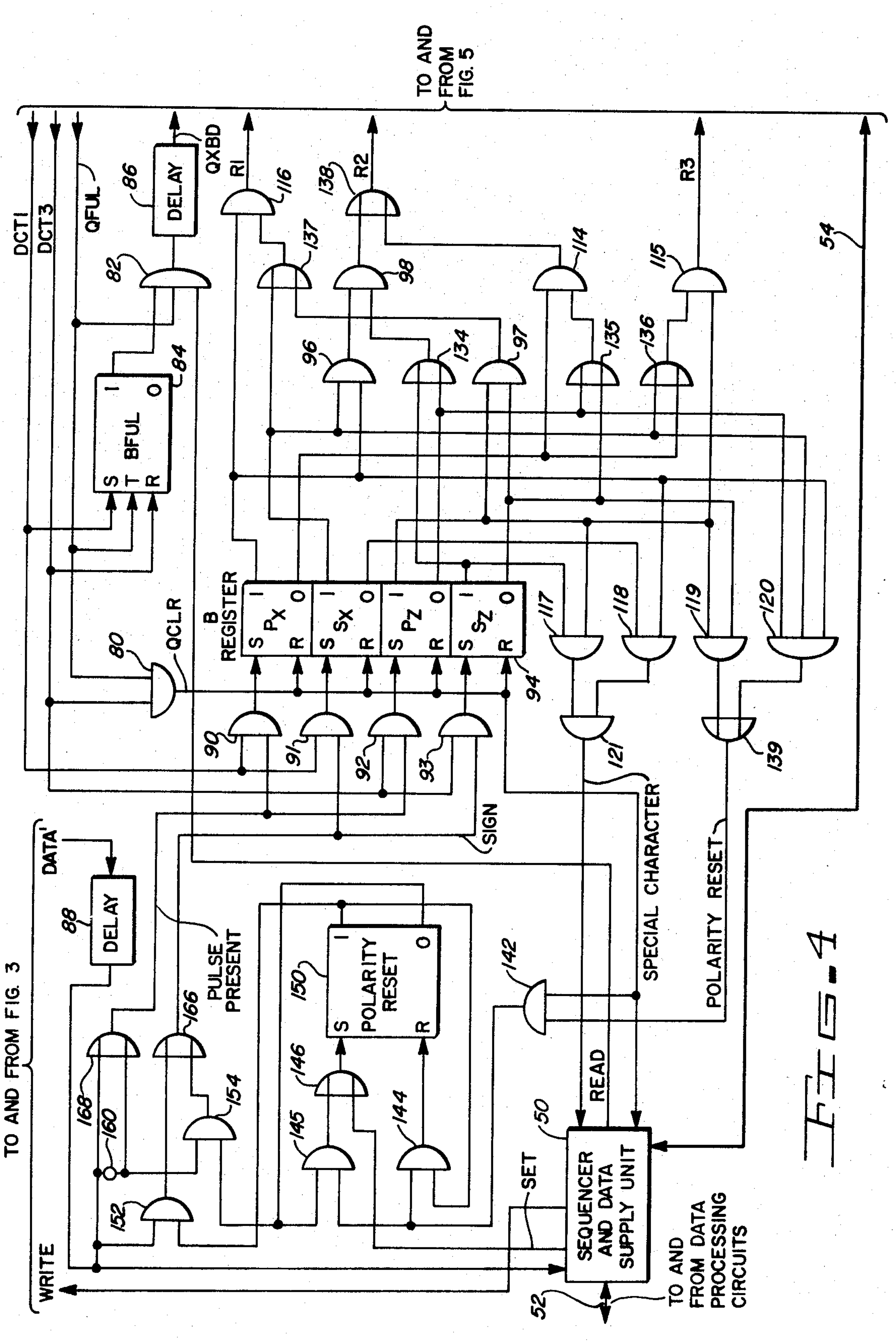
Figure 5:
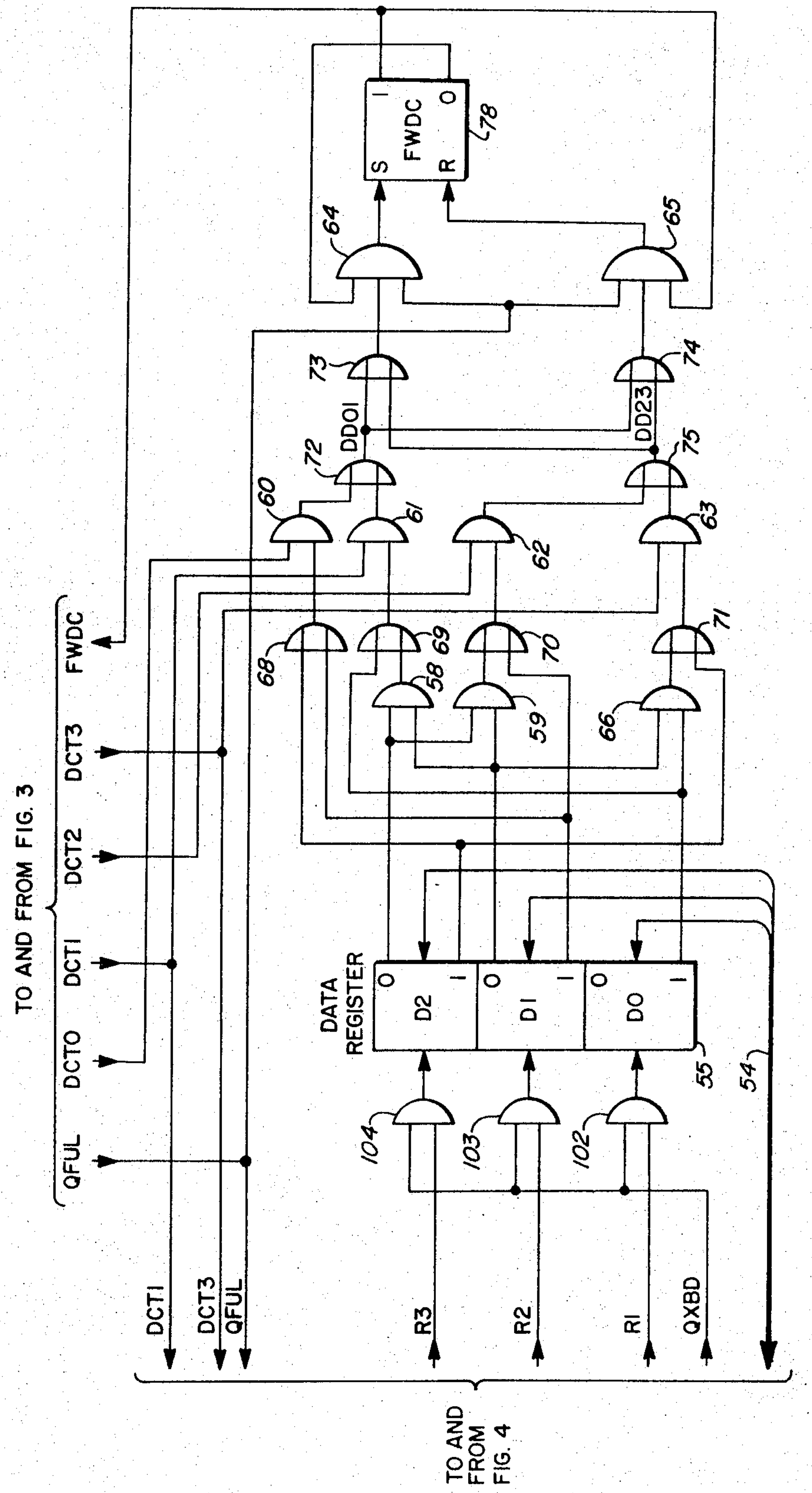
Figure 6:
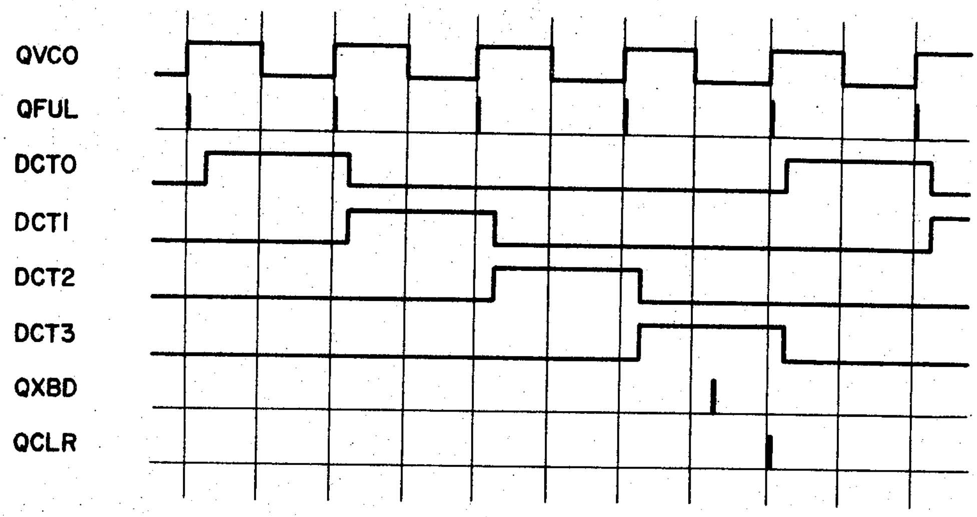
FIG. 6 is a timing diagram useful in understanding the representations of FIGS. 3, 4 and 5.

For a more complete understanding of the invention, reference is made to the logic schematics of FIGS. 3, 4 and 5 and their accompanying timing diagram illustrated in FIG. 6. The signals to be described will be referred to as high or enabling signals and low or disabling signals. The logic illustrated is of conventional nature. That is, an AND-gate is a logic element which provides at its output a high or enabling signal when each of its input signals are enabling signals. An OR-gate is a multiple input logic element which provides an enabling or high output signal when one or more of its input signals is a high or enabling signal. The term flip-flop, as is used in the present description, designates a bistable multivibrator with its two stable states being a set state in which there is a binary 1 or a high or enabling signal at its 1-output terminal and a reset state in which there is a binary 0 or low or disabling signal at its 1-output terminal.

Two types of flip-flops are utilized in the present description. The first type of flip-flop has two input terminals, a S (set) terminal, and a R (reset) terminal. In this device, a high or enabling signal applied to the S terminal will place the flip-flop into its set state and a high or enabling signal applied to the R terminal will place the flip-flop into its reset state. The other type of flip-flop differs from that just described only with respect to the inclusion of a third input terminal designated T. Flip-flops thus designated are trigger flip-flops and their operation differs from that previously described in that the flip-flop will change its state only upon the application of a high or enabling signal at the T terminal simultaneously with a high or enabling signal to either of the S or R input terminals.

Timing

In FIG. 3, a storage medium 10 in the form of a disc having a magnetizable coating is mounted for rotation in a clockwise direction about an axis 12 by a suitable drive means, not shown. An information track 16 arranged on storage medium 10 is provided for storing intelligence in the form of discrete magnetically polarized areas. A suitable transducer 24 is arranged adjacent track 16 and serves to generate electrical signals in response to relative motion between disc 10 and transducer 24 in response to the changing polarity of discrete areas on the track. The signals thus generated are amplified by an amplifier 26 and applied to a pulse processor 28.

Pulse processor 28 performs a series of cascaded operations. The first operation differentiates the amplified voltage waveshape from amplifier 26 and provides a waveshape having zero amplitude crossings corresponding in time to the peaks of an input signal from transducer 24. The signal is then amplified, clipped and again differentiated which shapes the signals into positive and negative pulses approximately 180 degrees out of phase with the peaks of the signals from transducer 24. The output signal identified as DATA' will therefore provide pulses corresponding to the polarity of flux reversals as represented by the waveform shown in FIG. 2(c) which are applied to read logic illustrated in FIG. 4.

Rectifier 30 transforms the output signals from pulse processor 28 into a series of unipolarity pulses which are then applied to a phase detector 32. The output of phase detector 32 is an error sense voltage which is transmitted to a voltage controlled oscillator 34 whose output signals are designated QVCO. The square QVCO signals have a frequency, in the embodiment disclosed, of four times the repetition rate of the data cell occurring in the information track 16 (see FIG. 6). The output signals of the voltage controlled oscillator 34 are transmitted via a feedback loop to the phase detector 32. Phase detector 32 compares the phase of its input signal from rectifier 30 with the output signal of the voltage controlled oscillator 34 to provide an output voltage signal, either positive or negative, representative of the difference in phase between these two signals. This output voltage signal is supplied to the voltage controlled oscillator 34 and causes the oscillator 34 to vary its output frequencies such that the output signal QVCO is in synchronism with the basic frequency of the signals being derived from the information track of disc 10. As used herein, information and data are synonymous.

The QVCO signal from oscillator 34 is transmitted to an input terminal of switch logic block 22. Another input signal transmitted to block 22 is from oscillator 18 which generates signals which are similar to those generated by the voltage controlled oscillator 34 having a frequency, in the present example, of four times the repetition rate of the data cell occurrence.

Switch control logic block 22 performs the function of selectively switching either the signals from the voltage controlled oscillator 34 or from a precision oscillator 18 to a pulse shaper 40. During a read operation, switch block 22 selectively applies the signals from voltage controlled oscillator 34 to pulse shaper 40 and during a write operation applies the signals from oscillator 18 to pulse shaper 40 as hereinafter described. Switch block 22 may, by way of example, utilize a relay operable to perform the switching operation in response to the presence or absence of a high or enabling write signal.

The QVCO signal applied by means of switch logic block 22 to pulse shaper 40, the output of which is designated as QFUL, may be seen in FIG. 6 as a train of narrow, positive going pulses occurring at the frequency rate of the QVCO signal. The QFUL signal is supplied as an input signal to a two stage counter 44 which is essentially two flip-flops in a counter configuration designed to step through the binary designations of zero through three. The four output terminals of counter 44 are applied as input signals to four AND-gates 45 through 48 in a manner such that the output signals of these four AND-gates, DCT0, DCT1, DCT2 and DCT3 (FIG. 3), divide the cell times into four equal parts. The signals thus far described provide the necessary timing for the writing of information onto or reading the information from disc 10.

Write Operation

During the write cycle of the disclosed embodiment, information is transmitted to a sequencer and data supply unit 50, FIG. 4, via an information bus 52 from suitable sources such as, for example, data processing circuits. This information enters the unit 50 prior to the beginning of a write cycle and contains a three bit configuration of information or data or a command for the "special" character and a suitable indicating designation that this is to be a "write" operation (a write command). This information normally comes from another component within the data processing system, for example, a data processor.

In FIG. 4, unit 50 supplies the configuration of data via a data bus 54 to a three bit data register 55, FIG. 5, which acts as a temporary holding register. Because this is a write operation, unit 50 supplies a write signal to the timing logic of FIG. 3 where it is provided as one input signal to AND-gate 54 and an input signal to switch logic block 22. The write signal provided to logic block 22 provides for switching the input signal from oscillator 18 to pulse shaper 40 for deriving the timing signals DCT0, DCT1, DCT2 and DCT3. AND-gate 56 gates the write signals through an amplifier 58 to transducer 24 for writing data on disc 10.

The data register 55 is a three bit register comprised of three flip-flops designated, respectively, D0 through D2. Data is inserted into this register in parallel from a decoding network during the read operation and transmitted from the register to an encoding network during the write operation.

The three bits in data register 55 provide output signals from flip-flops D0 through D2 for transmittal to a plurality of AND-gates 58 through 66 and to a plurality of OR-gates 68 through 75 for controlling a write data flip-flop 78 designated as FWDC.

FIG. 1 illustrates the possible contents of the data register when any of the nine pattern configurations may be recorded. For the case when the data register contains a 0 0 0 bit configuration, the flip-flops D0 through D2 will contain binary zeros. Upon the assumption that the D0 through D2 flip-flops each contain binary zeros, OR-gate 68 will be disabled. A low or disabling output signal from OR-gate 68 during the occurrence of a DCT0 signal, disables AND-gate 60, thus providing a low or disabling output signal to OR-gate 72.

The output signal DD01 from OR-gate 72 forms one of the input signals to each of OR-gates 73 and 74. The output signals from OR-gates 73 and 74 form, respectively, input signals to each of AND-gates 64 and 65. One of the terminals of each of AND-gates 64 and 65 are connected to receive the QFUL signal and also the 1 and 0 output signals of the FWDC flip-flop 78. Thus, it is seen that each time the DD01 signal is at a high or enabling level the FWDC flip-flop 78 will change its state.

The 1-output signal of FWDC flip-flop 78 is transmitted to one of the input terminals of AND-gate 56, FIG. 3. The other input signal to AND-gate 56 is the write signal from unit 50, FIG. 4. With the enabling and disabling of AND-gate 56 by the 1-output signal of flip-flop 78, a signal is transmitted from AND-gate 56 to amplifier 58 which transmits a corresponding signal to transducer 24 to write a flux transition on data track 16 of disc 10.

For the case of a 0 0 0 bit configuration in data register 55, FIG. 5, the DD01 signal at the output terminal of OR-gate 72 will be of a low or disabling level which is transmitted to one input terminal of each of OR-gates 73 and 74 which in turn provide low or enabling output signals to one of the input terminals of AND-gate 64 and 65. AND-gates 64 and 65 provide low or disabling output signals to the S and R input terminals, respectively, of FWDC flip-flop 78. Flip-flop 78 will not change state at the DCT0 time and a transition of flux reversal will not be written at the $T_0$ position of the data cell.

With the 0 0 0 bit configuration in data register 55, the signals at the 0-output terminals of flip-flops D1 and D2 applied to the input terminals of AND-gate 58 will both be high or enabling signals. AND-gate 58 is thereby enabled which, in turn, provides a high or enabling signal to enable OR-gate 69 for applying a high or enabling input signal to AND-gate 61. Thus, with the occurrence of a DCT1 signal at a second input terminal of AND-gate 61 conjunction occurs in AND-gate 61 and it will be enabled to provide a high or enabling signal to the two input terminals of OR-gate 72. OR-gate 72 is thereby enabled to provide a high or enabling DD01 signal to OR-gates 73 and 74. The output signals of these two OR-gates form, respectively, input signals to each of the AND-gates 64 and 65. Thus, it is seen that with a high or enabling DD01 signal and if FWDC flip-flop 78 is in a reset state, then AND-gate 64 will be enabled and upon the occurrence of a QFUL signal a high or enabling input signal will be transmitted from AND-gate 64 to the S input terminal of flip-flop 78. Thus, at a DCT1 time, flip-flop 78 will be placed in a set state, providing a high or enabling FWDC signal from its 1-output terminal for transmittal to one input terminal of AND-gate 56. With a high or enabling write signal present at a second input terminal of ANDlgate 56, conjunction will occur in AND-gate 56 and a high or enabling output signal will be transmitted to amplifier 58. An output signal from amplifier 58 is then transmitted to transducer 24 to write a flux transition on the data track 16 of disc 10. This transition is written at the T1 position of a data cell in which a 0 0 0 bit configuration is to be written. Similarly, if FWDC flip-flop 78 was in a set state and DD01 was enabled, FWDC would be reset at the time of DCT1. Hence, AND-gate 56 will provide a current reversal at time DCT1 for a 0 0 0 data configuration.

With reference to FIG. 5, it is seen that the 0 0 0 bit configuration in flip-flops D1 and D2 of data register 55 provide high or enabling output signals from its 0 terminal to AND-gate 59. Thus, AND-gate 59 is enabled to provide a high or enabling signal for enabling OR-gate 70 which provides a high or enabling output signal to one input terminal of AND-gate 62. At the occurrence of a DCT2 signal, AND-gate 62 is enabled to provide a high or enabling output signal for enabling OR-gate 75 which, in turn, provides a high or enabling output signal designated DD23 to one input terminal or each of OR-gates 73 and 74. OR-gates 73 and 74 are thereby enabled to provide high or enabling output signals to each of AND-gates 64 and 65. Whatever the setting of FWDC, as described in the previous paragraph, FWDC 78 will reverse its state, again causing a reversal of the write current in transducer 24. This transition is written at the $T_2$ time of a data cell in which is being written the bit configuration 0 0 0.

Flip-flop D0, shown in FIG. 5, contains a binary 0 and being in a reset state, provides a low or disabling output signal from its 1-output terminal to disable AND-gate 66, and flip-flop D1 provides a low or disabling output signal from its 0-output terminal to also disable AND-gate 66. The D2 flip-flop also contains a 0 to provide a low or disabling output signal at its 1-output terminal for transmission to one of the input terminals of OR-gate 71. OR-gate 71 was previously disabled by the output signal from disabled AND-gate 66 and thus provides a low or disabling output to one input terminal of AND-gate 63. Thus, at a DCT3 time, AND-gate 63 is not enabled and a low or disabling output signal is transmitted by it to OR-gate 75. OR-gate 75 thereby provides a low or disabling output signal to both OR-gates 73 and 74. The disabled OR-gates 73 and 74 provide low or disabling input signals to AND-gates 64 and 65 which are, therefore, disabled to prevent the change of the state of flip-flop 78. Since the flip-flop 78 does not change states, the FWDC output signal will not provide for the writing of a flux transition at the $T_3$ time of the cell in which a bit configuration of 0 0 0 is to be written.

Accordingly, for a 0 0 0 bit configuration, the logic of FIGS. 3 and 5 provides for the writing of flux reversals at the $T_1$ and $T_2$ times of the cell. The encoding network provides for the writing of flux transitions at the required $T_0$ through $T_3$ positions of a data cell in a similar manner for any of the other eight bit configurations in accordance with the respective patterns of flux transitions illustrated in FIG. 1. Each successive configuration written is successively transferred from unit 50 into data register 55 for recording in the manner previously described.

With reference to FIG. 6 at the end of a DCT3 time and the occurrence of the next QFUL signal, an AND-gate 80, FIG. 4, is enabled to provide a high or enabling QCLR signal to unit 50. A QCLR signal is transmitted by enabled AND-gate 80 for utilization by unit 50 to control the insertion of a new three bit configuration via a bus 52 into data register 55 in the manner previously described.

While the foregoing description of the write operation has been explained with respect to timing initially derived from a precision oscillator, it is not, however, a requirement of the present invention. If desired, the output of a timing track on the storage medium, in this case a disc, could be utilized to initiate generation of the desired timing pulses.

Read Operation

The timing signals in the read operation of the present invention are generated from the data track in the manner previously described. The use of data signals for timing purposes as opposed to the oscillator previously described for the write operation is a function of switch 22.

With the initiation of a read operation, a read command received via bus 52 by unit 50, FIG. 4, results in the generation of a read signal by unit 50. This read signal forms one signal to a three input terminal AND-gate 82, the output signal of which is applied through a suitable delay means 86 to generate a QXBD signal. This QXBD signal affects the parallel transfer of the contents of a B register 94 to the data register 55, FIG. 5, via leads identified as $R_1$, $R_2$ and $R_3$. The QFUL signal is transmitted to a second input terminal of AND-gate 82 with its third input signal being transmitted to it from the 1-output terminal of a BFUL flip-flop 84.

The BFUL flip-flop 84 is placed into its set state by the QFUL signal at the end of the DCT1 signal, FIG. 3, and into its reset stage by the QFUL signal at the end of the DCT3 signal from counter 44. The QXBD signal from the output terminal of gate 82 is delayed by delay means 86 for a period which may be, for example, one half the DCT3 up time, to permit the transfer of the decoded contents of the B register 94 to the data register 55. During the DCT3 time following the entry of an information bit being read at $T_3$ position of a cell, a QXBD signal, FIG. 6, is provided at approximately mid $T_3$ up time to initiate the parallel transfer of data being read from each individual cell. The BFUL flip-flop 83 employs the QFUL signal to trigger its change of state upon the occurrence of one of the DCT1 and DCT3 signals.

In order to assure proper sampling times at positions $T_1$ and $T_3$ of each data cell, it is necessary that the incoming data from a track be preceded by a synchornizing code which may, for example, be a sequence of ones and zeros in a specified pattern, followed by an address of the data which is to be read. Since the synchronization process is not material to this invention, it will not be described in detail. However, a specified sequence of bit configurations are available for phasing. A header pattern to precede data to be read may, by way of example, utilize the transition patterns of FIG. 1 corresponding to the 0 0 0 or 0 0 1 or 1 1 0 bit configurations in a series followed by a special transition pattern or character of no transition, transition, no transition, transition and identified as SPECIAL in FIG. 1. The resulting header pattern would have a series of the previously mentioned patterns corresponding to certain bit configurations followed by a series of special transition patterns which are in turn followed by an address and other header contents and subsequently followed by data. The special transition pattern would never appear in a stream of data, or shift thereof, and would therefore be detected as a start transition pattern to control the start of a read operation at the required portion of a cell.

Upon detection of the last fixed format header character before decoder activation, supply unit 50 will provide a high or enabling SET output signal on a lead to OR-gate 146. OR-gate 146 is thereby enabled to set polarity reset flip-flop 150 to its set state to provide a high or enabling signal to one input of AND-gate 152 for establishing the convention for receiving a negative polarity signal at the first flux reversal occurring in a next cell to be read in the manner previously described.

Electrical signals indicative of the data recorded on the data track 16, FIG. 3, of disc 10 are supplied from the amplifier 26 through pulse processor 28 and a suitable delay means 88 to one input terminal of AND-gate 152 and to one input of OR-gate 168. The output from delay means 88 is also applied through inverter 160 to one input of AND-gate 154 and to one input of OR-gate 168. These signals are also delivered to the sequencer and unit 50 for purposes of synchronizing that unit in the manner previously described.

Data from the output terminal of delay means 88 will appear as a positive going pulse with each flux reversal in a positive polarity direction and a negative going pulse with each flux reversal in a negative direction as provided by successive differentiations of an input voltage signal derived as previously described from a flux transition pattern recorded on data track 16.

A positive or negative pulse at the output of Delay 88 will be applied to one input terminal of OR-gate 168 and after voltage reversal by inverter 160 to the other input terminal of OR-gate 168. When a pulse is present, one of the OR-gate 168 input terminals will be enabled which will provide a high or enabling signal to one input terminal of AND-gate 90 and 92 which have a second input provided by signals DCT1 and DCT3, respectively. AND-gates 90 and 92 therefore provide for sampling the pulse present signal to enter the indication that a pulse was present at the $T_1$ or $T_3$ cell positions, respectively, into a corresponding one of B register flip-flops $P_x$ and $P_z$, respectively, to indicate the detection of a flux reversal at either of those two positions in a cell. Similarly, a sign output signal from OR-gate 166 is applied to one input terminal of AND-gates 91 and 93 which have a second input provided by the DCT1 signal and DCT3 signals, respectively, to provide for determining the presence of a positive or negative pulse at $T_1$ and $T_3$ cell positions, respectively. Pulses having a "+" polarity if they agree with the polarity reset 150 output and present at $T_1$ and $T_3$ cell positions will thereby be detected and indications entered into corresponding $S_x$ and $S_z$ flip-flops of B register 94. Such indication is obtained when either input terminal to OR-gate 166 is enabled as a result of AND-gate 152 being enabled by a positive data pulse and a "1" output from polarity reset 150 or when a negative pulse reversed by inverter 160 coincides with a polarity reset "0" output.

As an example of operation, the presence of a pulse at $T_1$ or $T_3$ time or position will provide for enabling one of the input terminals of OR-gate 168, which will enable AND-gate 90 or 92 at such times thereby setting $P_x$ or $P_z$, indicating "pulse present", or the presence of a positive or negative pulse. A high or enabling signal from the output terminal of either of AND-gates 152 or 154 will provide a high or enabling signal to one input terminal of OR-gate 166 which will be enabled to provide a high or enabling SIGN signal to one input terminal of AND-gates 91 and 93. One of AND-gates 91 and 93 will then be enabled at DCT1 or DCT3 time, respectively, to provide for the entry of a SIGN indication into a corresponding B register flip-flop $S_x$ or $S_z$, respectively. Hence, in the event that OR-gate 166 is enabled to indicate the presence of either polarity pulse, the SIGN signal will be at a high or enabling level at one input terminal of AND-gates 91 and 93 if polarity reset 150 has the same polarity as the signal. One of AND-gates 91 and 93 would then be enabled by the presence of a high or enabling DCT1 or DCT3 signal to provide for placing a corresponding one of the $S_x$ or $S_z$ flip-flops in a set state indicating the detection of a "+1"pulse at either a $T_1$ or $T_3$ position of a cell, respectively.

Following sampling of the data to determine the presence of flux reversals at each of the $T_1$ and $T_3$ positions of a data cell, the B register will contain a four stage configuration corresponding to the two samples of flux reversals in the form of indications of this presence and polarity. The presence and polarity indications provided by the outputs of flip-flops $P_x$, $P_z$ and $S_x$, $S_z$ will therefore define the trits corresponding to positions X and Z of a cell being read.

The contents of the B register must then be decoded by a decoding network comprising AND-gates 96 through 98 and 114 through 121, and OR-gates 134 through 129. The contents of the B register will contain a pattern of 1's and 0's corresponding to the flux reversal pattern of positive and negative transitions of a cell read which may be, by way of example, the 0 0 0 bit configuration illustrated in FIG. 1. After reading the data pattern for data bits 0 0 0, the B register would have flip-flop $P_x$ being in a set state and flip-flops $S_x$, $P_z$ and $S_z$ being in a reset state.

A low or disabling signal from the 1 output of the $P_z$ flip-flop will disable AND-gate 97 to provide a low or disabling signal to one input terminal of OR-gate 137. A low or disabling output signal from the output terminal of the $S_x$ flip-flop applied to a second input terminal of OR-gate 137 in conjunction with the low or disabling signal from AND-gate 97 will then disable OR-gate 137 to provide a low or disabling input signal to one input terminal of AND-gate 116, thereby providing a low or disabling R1 output signal.

In a similar manner, a low or disabling output signal from the 1-output terminal of the $S_x$ flip-flop is applied to one input terminal of AND-gate 96 to disable AND-gate 96 thereby providing a low or disabling signal to disable AND-gate 98 which provides a low or disabling output signal to one input terminal of OR-gate 138. A low or disabling signal from the 0 output terminal of the $P_x$ flip-flop applied to one input terminal of AND-gate 114 disables AND-gate 114 to provide a low or disabling input signal to a second input terminal of OR-gate 138 which is now fully disabled to provide a low or disabling R2 output signal. Similarly, a low or disabling signal from the 1-output terminal of the $P_z$ flip-flop applied to one input terminal of AND-gate 115 disables AND-gate 115 to provide a low or disabling output signal on the R3 output line. Therefore, the R1, R2, R3 output signals will all be at a low or disabling level to correspond to a 0 0 0 binary bit configuration as being read from the DATA' signal.

The polarity reset control signal from AND-gate 142, FIG. 4, will determine whether the polarity reset 150 reference will be reversed for the succeeding cell or not. Since the function of the polarity reset is to assure that, according to convention, the first pulse in each cell will be a ternary $-$ 1, reference to FIG. 1 will show no resetting for the successive cell will be necessary if the present cell pattern, properly phased in polarity, contains an even number of pulses. In the present example where the data content corresponds to a 0 0 0 binary configuration, it will be noted that the output of OR-gate 139 will be disabled because neither input signal thereto is of enabling value. The upper input terminal of OR-gate 139 is disabled because the $P_z$ 1 output signal is a disabling signal thereby disabling AND-gate 119. Similarly, the lower input terminal to OR-gate 139 is disabled because the $S_x$ 1 output signal is at low level thereby disabling the middle input terminal of AND-gate 120. Hence, polarity reset 150 will not be reversed at the disabled output condition of OR-gate 139 which serves as an input signal to AND-gate 142.

An additional example of the reading of data will hereinafter be described to illustrate a somewhat different set of conditions. In this case, the pattern shown as the first cell of FIG. 2(*c*) will be assumed with signal polarities also as shown. An initial state of polarity reset 150 in the 1 or set position must also be assumed if proper polarity resetting of prior cells had taken place. Hence, the read logic of FIG. 4 has been initialized by sequencer and data supply unit 50 prior to the reading of a cell, the polarity reset flip-flop 150 will have been set in its set states as previously described. The signal from the one output terminal of flip-flop 150 will then be at a high or enabling level which is applied to one input terminal of AND-gate 152. The DATA' signal applied through delay means 88 will be a negative pulse at a time corresponding to the $T_0$ position such that a high or enabling signal will be provided by inverter 160 to one input terminal of OR-gate 168 which will be enabled. However, neither AND-gates 90 or 92 will be enabled at $T_0$ since the second input signals to AND-gates 90 and 92 are enabled only at times $T_1$ and $T_3$, respectively.

At the time of a $T_1$ position, the DATA' signal applied through delay means 88 will be at a no reversal or 0 level indicating the absence of a positive or negative pulse, therefore, neither input to OR-gate 168 will be high and one thereby allowing AND-gates 90 and 92 to remain in the disabled state. Because AND-gates 90 and 92 are disabled at time $T_1$, B register 94 stages $P_x$ and $P_z$ will remain in the unset state. No change will be effected in any of the B register 94 stages since all inputs thereto are time gated at times $T_1$ and $T_3$ only via AND-gates 90 through 93.

At the time corresponding to the $T_3$ position, a negative polarity pulse DATA' signal will be applied through delay means 88 to one input terminal of OR-gate 168 via its polarity reversal accomplished by inverter 160. With the output signal of OR-gate 168 at its high or enabled level and the simultaneous occurrence of an enabled DCT3 signal at both input terminals of AND-gate 92, the latter will be enabled to provide a high or enabling input signal to the S terminal of flip-flop $P_z$. Neither AND-gates 152 or 154 will be enabled since the negative polarity of the signal pulse out of Delay 88 is opposite to the flip-flop 150 state of "1". Hence, both input terminals of OR-gate 166 are low and the disabled output terminal of OR-gate 166 will fail to set $S_z$ even though one input terminal of AND-gate 93 has been enabled by a high DCT3 signal.

The B register content provides for the $P_x$, $S_x$ and $S_z$ flip-flops being in a reset state and the $P_z$ flip-flop in a set state corresponding to a 0 1 1 binary data configuration. The 1-output terminal of the $P_x$ flip-flop will provide a low or disabling output signal to one input terminal of AND-gate 116, thereby disabling AND-gate 116 to provide a low or disabling R1 output signal. The $S_z$ flip-flop being in a reset state will provide a high or enabling output signal from its 0 output terminal to one input terminal or OR-gate 135 to enable OR-gate 135 which then provides a high or enabling input signal to one input terminal of AND-gate 114. A second input signal to AND-gate 114 is provided from the 0 output terminal of the $P_x$ flip-flop, which is in a reset state, thereby providing a high or enabling input signal to the second input terminal of AND-gate 114. AND-gate 114 is thus enabled to provide a high or enabling signal for enabling signal for enabling OR-gate 138. Or-gate 138 being enabled will provide a high or enabling R2 output signal.

Similarly, with the $P_z$ flip-flop in a set state, a high or enabling signal will be provided from its one output terminal to one input terminal of AND-gate 115, and the $P_x$ flip-flop will provide a high or enabling output signal from its 0-terminal to one input terminal of OR-gate 136 which is enabled to provide a high or enabling signal to a second input terminal of AND-gate 115. AND-gate 115 is therefore enabled to provide a high or enabling R3 output signal. Thus, the respective output signals R1, R2 and R3 will be low, high and high, respectively, corresponding to a 0 1 1 binary digit configuration.

Since the $T_3$ position contained a flux reversal corresponding to a $-$ 1 trit, it is necessary to reset polarity reset flip-flop 150 since the first non-reversal of a next cell must be a $-$ 1 trit state by convention. A polarity reset OR-gate 139 must therefore be enabled from decoding the output states of the $P_x$, $S_x$, $P_z$ and $S_z$ flip-flops. With the $P_z$ flip-flop in a set state, a high or enabling output signal will be provided from its 1-output terminal to one input terminal of AND-gate 119 which receives a second input signal from the 0 output terminals of the $S_z$ flip-flop. Since the $S_z$ flip-flop is in a reset state indicating a negative polarity pulse, a high or enabling output signal from its 0 output terminal is applied to a second input terminal of AND-gate 119 to enable AND-gate 119.

AND-gate 119 then provides a high or enabling signal to one input terminal of OR-gate 139 to enable OR-gate 139 which then provides a high or enabling output signal to one input terminal of AND-gate 142. AND-gate 142 will be enabled by high or enabling QCLR signal to a time following the presence of the high or enabling DCT3 signal and prior to a time corresponding to the $T_1$ position of the next cell. AND-gate 142 is, therefore, enabled to provide a high or enabling input singal to one input terminal of each of AND.gates 145 and 144.

Since the polarity reset flip-flop 150 was previously in a set state due to initialization as previously described, a high or enabling output signal from its 1-terminal is applied to a second input terminal of AND-gate 144 which is enabled to provide a high or enabling input signal to the R input terminal of flip-flop 150. Flip-flop 150 is, thereby, placed in its reset state to provide a low or disabling output signal to AND-gate 152. Hence, any positive polarity pulses from Delay 88 during the next cell period will fail to set the $S_x$ and $S_z$ registers. Also, since the polarity reset 150 "0" output is enabled, one input terminal to AND-gate 154 together with a negative electrical polarity pulse from Delay 88 will cause AND-gate 154 to be enabled for at least a period corresponding to one cell time. Hence, an electrically negative signal pulse will enable OR-gate 166 to provide a set pulse at $T_1$ or $T_3$ times in accordance with the code convention previously described.

A second case where the polarity of the DATA' signal must be inverted and, therefore, a polarity reset operation performed is controlled by AND-gate 120. With reference to FIG. 1, it is seen that where the pulse at the $T_1$ position is of positive polarity and there is no pulse at the $T_3$ position, it is necessary to invert or reset polarity before the next cell since the polarity of the next pulse must be negative according to convention. AND-gate 120 is enabled by output signals from the $P_x$, $S_x$, $P_z$ and $S_z$ being in the set, set, reset and reset states, respectively, by decoding in the manner previously described to provide a high enabling signal to one input terminal of OR-gate 139. OR-gate 139 then responds to provide for controlling the setting or resetting of polarity reset flip-flop 150 in the manner previously described.

It must be borne in mind that the previous example considered the case of a first signal pulse in a cell having a negative electrical sense and a flip-flop 150 in its "1" or set state. An equally likely initial condition would be to have the initial cell pulse be electrically positive and flip-flop 150 in its 0 or reset state. In either case, the inverting action of flip-flop 150 controlled by the pattern previously read will always assure that the initial pulse in each cell will be interpreted as a ternary $-1$.

During a synchronization operation preparatory toward a read operation, the SPECIAL but configuration as illustrated in FIG. 1 having a ternary code of $-1$ and $+1$ corresponding to the $T_1$ and $T_3$ positions, respectively, may be used to provide for the B register contents to be $P_x$ in a set state, $S_x$ reset, $P_z$ in a set state and $S_z$ in a set state. The $S_x$ flip-flop being in a reset state will provide a high or enabling signal from the 1 output terminal of the $P_x$ flip-flop to enable AND-gate 118 for providing a high or enabling input to one input of AND-gate 121. The $P_z$ flip-flop being in a set state will provide a high or enabling output signal on its one terminal which is applied to one input of AND-gate 117 in conjunction with a high or enabling output signal from the one terminal the $S_z$ flip-flop to enable AND-gate 117. AND-gate 117 then provides a second high or enabling input to AND-gate 121, which is in turn enabled to provide a high or enabling special character signal to the sequencer and data supply unit 50. The supply unit 50 then may utilize the SPECIAL character for header identification purposes as previously described.

During the occurrence of a DCT3 signal and the entry of the flux reversal indications into the B register, FIG. 4, it is required that the contents of the B register 94 be decoded and the output signals existing on lines R1 through R3 be entered in parallel into flip-flops D0 through D2 of data register 55. The QXBD signal from the output terminal of AND-gate 82 and delay means 86, as previously described, is provided for transmitting a high or enabling output signal to one input terminal of each of AND-gates 102, 103 and 104. Gates 102–104 are thereby selectively enabled in accordance with the presence of high or enabling signals on respective ones of leads R1, R2 and R3, transmitted to the other input terminals of AND-gates 102–104 to provide high or enabling signals representing the decoded contents of the B register 94 for entrance into the data register 55.

Similarly, the states of B register flip-flops $P_x$, $S_x$, $P_z$ and $S_z$ at the completion of each reading of flux reversals in a cell, corresponding to the trit configurations illustrated in FIG. 1, will be decoded by the decoding gates and entered into the data register 55.

After the entry of the decoded contents of the B register into the data register, the B register is cleared by placing the $P_x$, $S_x$, $P_z$ and $S_z$ flip-flops in a reset state prior to the occurrence of the next DCT1 signal. This is accomplished at the end of the DCT3 time when the QCLR signal is provided by AND-gate 80 at the time illustrated in FIG. 6. At the conjunctive occurrence of the QFUL signal and the DCT3 signal, AND-gate 80 is enabled to provide a high or enabling QCLR signal which is simultaneously applied to each of the R input terminals of flip-flops $P_x$, $S_x$, $P_z$ and $S_z$ of B register 94 for placing each of the flip-flops in a reset state prior to the occurrence of the next DCT1 signal.

At the occurrence of each succeeding DCT1 signal, the reading of a next data cell is initiated and the corresponding flux reversal pattern of indications will be entered into the B register at $T_1$ and $T_3$ times and transferred to the data register from which the contents of the data register are available for transfer by means of data bus 54 to sequencer and data supply unit 50. Sequencer and data supply 50 may, by way of example, upon detecting the QCLR signal, provide for the further transfer of the received contents of data register 55 to the data processing circuits by means of bus 52.

Thus, in accordance with the invention claimed, a new and improved high density recording code and system for implementing it is provided in which errors are greatly reduced by requiring the detection of pulses and their polarity at only two out of four cell positions. Automatic error correction is also provided by the ability to ignore any pick up or drop out of flux reversal information at positions where a pulse/polarity decision is not required and correctly provide a three bit configuration or the special character being read.

While the principles of the invention have now been made clear in an illustrative embodiment, there will be immediately obvious to those skilled in the art many modifications of structure, arrangements, proportions, the elements, materials, and components used in the practice of the invention, and otherwise, which are particularly adapted for specific environments and operating requirements without departing from those principles. The appended claims are, therefore, intended to cover and embrace any such modification, within the limits only of the true spirit and scope of the invention.

What is claimed is:

1. A system for recording information on a single track of a recording medium comprising:
- a source of electrical signals having binary values representative of the information to be recorded, the electrical signals being grouped into triplets of electrical signals for purposes of recording;
- a conversion means connected to said signal source for converting each triplet to a pattern of four successive ternary signals having negative, zero and positive values, each ternary pattern being related to a triplet by a code whereunder the ternary signals in the second and fourth positions in the pattern identify unique triplets, the first two and the last two positions in the pattern each include at least one non-zero ternary signal, the maximum number of successive positions in a pattern with a zero ternary signal is two, the polarity of the first non-zero ternary signal in a pattern is known, and successive non-zero ternary signals within a pattern alternate in polarity; and
- a recording head connected to said conversion means and responsive to ternary patterns produced thereby to record representations of the patterns on the recording medium wherein different ternary signals are represented by areas having different characteristics.

2. A system as set forth in claim 1 further including means for reading the signal representations recorded in the second and fourth positions in each pattern while disregarding the representations recorded in the first and third positions, and means for decoding the signals read to identify the bit configuration of the triplet represented by the recorded pattern.

3. A system as recited in claim 2 wherein the recorded representations of non-zero ternary signals are magnetic flux transitions having one polarity for a positive ternary signal and another polarity for a negative ternary signal while a zero ternary signal is represented by the absence of a flux transition.

4. A system as recited in claim 1 wherein the recorded representations of non-zero ternary signals are magnetic flux transitions having one polarity for a positive ternary signal and another polarity for a negative ternary signal while a zero ternary signal is represented by the absence of a flux transition.

5. A method of recording information along a single track in a recording medium including the steps of:
- generating electrical signals having binary values representative of the information to be recorded;
- grouping the binary electrical signals in successive triplets of binary electrical signals;
- converting each triplet of binary electrical signals to a pattern of ternary electrical signals having negative, zero or positive values to be recorded at four successive transition postitions on the single track, each unique triplet of binary signals being converted to a unique pattern of ternary signals through a conversion code whereunder the ternary signals in the second and fourth transition positions identify unique triplets of binary electrical signals, the first two and the last two transition positions in each pattern each include at least one non-zero ternary signal, the maximum number of successive transition positions with a zero ternary signal is two, the polarity of the first non-zero ternary signal in a pattern is known, and successive non-zero ternary signals within a pattern alternate in polarity; and
- generating successive magnetic flux reversals for successive non-zero ternary signals for magnetizing the recording medium at two or more of the transition positions in each pattern in a direction related to the polarity of the ternary signal to be recorded.

6. A method of reading information recorded by the method of claim 5 comprising sensing the presence of flux reversals recorded at the second and fourth transition positions only in each pattern, logically decoding the sensed fields to determine which triplet of binary digits is represented, and outputting the represented triplet of binary digits.

* * * * *